Patented Oct. 12, 1954

2,691,650

UNITED STATES PATENT OFFICE 2,691,650

DIAZOTIZING OF GLYCINE ESTERS

John A. S. Hammond, Baltimore, Md., assignor to National Distillers Products Corporation, New York, N. Y., a corporation of Virginia No Drawing. Application December 14, 1951, Serial No. 261,740

6 Claims. (Cl. 260—239)

The present invention relates to the diazotization of glycine esters and provides improvements in the previously proposed methods for diazotizing such compounds.

More particularly, the invention provides improvements in the previously proposed method whereby an acid salt of a glycine ester is reacted with a metal nitrite, sodium nitrite, for instance, in acidic aqueous solution in the presence of a non-aqueous solvent for the resultant diazotized glycine ester.

In conventional practice, this process has been carried out by mixing together the salt of the glycine ester and the nitrite in aqueous solution and the non-aqueous solvent, chilling the mixture well below room temperature, usually below 0° C., and gradually adding dilute sulfuric acid to the pre-cooled mixture, while maintaining the mixture at a low temperature.

It has been recognized that the diazotized glycine esters are readily decomposed by aqueous acid solutions and it has been considered necessary, even at the low temperatures employed, to effect a partial diazotization in successive steps, i. e., adding the acid in successive increments with intermediate separation of the diazotized product. This procedure has been time consuming and costly and further has resulted in relatively low yields.

The reaction involved is exothermic and, as heretofore carried out, the evolution of heat is not uniformly spread throughout the reaction period but occurs in undue amounts in the early stages of the reaction. This has necessitated the pre-cooling of the reactants to a very low temperature and, for this purpose, cooling baths, having a temperature as low as —23° C. have been used. Such refrigeration has been found especially costly, but nevertheless has not wholly removed the hazard of large scale operation.

In an effort to avoid the troublesome stepwise operation, it has more recently been proposed to use, as the non-aqueous solvent, a liquid aliphatic halogenated hydrocarbon having one or two carbon atoms per molecule. These halogenated hydrocarbons allegedly protect the diazotized glycine ester from the acid to an extent such that the diazotization may be carried out in essentially one step. However, the use of such solvent has not avoided the necessity for prechilling the mixture to 0° C., or lower, before acidification and maintaining abnormally low reaction temperatures by refrigeration, using for this purpose a cooling fluid at a temperature well below 0° C.

It is a primary object of my present invention to avoid the necessity of refrigeration and low temperature operation. A further object is to avoid the necessity of carrying out the process in successive steps and a still further object is to increase the yield of the diazotized glycine ester.

These and other advantages, as will hereinafter more fully appear, are attained by my present invention, according to which separate addition of acid to the reactant mixture is entirely avoided.

In accordance with my present process, the aqueous nitrite solution is first mixed with the halogenated hydrocarbon solvent, of the type hereinafter more fully described, and thereafter there is gradually added to this mixture an aqueous solution of the acid salt of the glycine ester having a pH within the range of about 1.0 to 1.6. The acidifying of the reactant solution is effected solely by the acid pH of the latter solution, no other acidic material being added.

I have found that where this procedure is followed, the process may be carried out at room temperature and the product obtained in yields of 90%, or higher. While it is usually desirable to carry out the reaction at room temperature because of reduced operating costs, lower temperatures, and even somewhat higher temperatures, may be employed.

The halogenated solvent employed in my improved process may be any liquid aliphatic halogenated hydrocarbon containing not more than two carbon atoms and which is a solvent for the resultant diazoacetate. Carbon tetrachloride has been found particularly advantageous in the preparation of ethyl diazoacetate, for instance. However, in place thereof one may use, for instance, methylene chloride, methylene bromide, ethylene dichloride, ethylene bromide, trichloroethylene, tetrachoroethylene, 2,2 - difluoro - 1-chloroethane, 2,2 - difluoro - 1,1 - dichloroethane, methyl iodide, ethyl iodide, or the like.

As previously noted, the salt of the glycine ester is added in aqueous solution at a pH within the range of 1 to 1.6. Normally, the pH of an aqueous solution of ethyl glycine hydrochloride, for instance, is higher than 1.6. Relatively pure samples have been known to run as high as 4.3. Less pure samples have been found to have pH characteristics within the indicated range. In using the latter in my improved process, no adjustment of pH is necessary. Where the pH of the glycine ester salt solution is without the indicated range, the adjustment of the pH of the solution may be accomplished in one of a number of ways. For instance, where the pH of the glycine ester salt solution is greater than 1.6, it may be adjusted by acidifying the solution, as by adding a dilute acidic reactant such, for instance, as hydrochloric acid, sulfuric acid, or acetic acid, or an acid salt, for instance, sodium bisulfate monohydrate. Where the pH of the solution is below 1, it may be adjusted by adding a base material, or a buffer, sodium acetate, for instance. It will be understood, however, that no acidic reactant is added other than that which is premixed with the glycine ester salt solution prior to the mixing of the glycine ester salt with the nitrite solution.

The invention is applicable generally to the diazotization of glycine esters and contemplates the use of various reactants useful in the above-noted conventional procedure. I have, with particular advantage, used sodium nitrite in the diazotization of ethyl glycine hydrochloride and the invention will be more particularly illustrated by operations in which those reactants were employed. It will be understood, however, that in place of ethyl glycine hydrochloride, the salts of other acids may be used, for instance, the sulfate, phosphate, acetate, proprionate, or the like, of the glycine ester. Also, these salts of other esters of glycine may be used, the invention being applicable to any aminoacetic acid ester having the formula

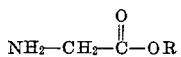

in which R is a hydrocarbon radical. It is especially useful in the diazotizing of esters of this type of which R is an alkyl radical of from 1 to 6 carbon atoms.

It is presently preferred to use sodium nitrite as the nitrite reactant. However, the invention contemplates the use of potassium nitrite, or, in fact, any alkali metal, or alkaline earth metal nitrite. It is necessary that the nitrite be water-soluble.

The proportions of the several constituents is not critical and may be varied over a considerable range, as understood by the art.

The process will be further illustrated by the following specific examples:

*Example I*

40 cc. of an aqueous solution containing 15 grams of sodium nitrite and 150 cc. of carbon tetrachloride were mixed in a 250 cc. glass flask equipped with an agitator, thermometer, dropping funnel and cooling bath. This mixture was cooled to 20° C. and thereafter, over a period of 45 minutes, there was added 50 cc. of an aqueous solution containing 25 grams of ethyl glycine hydrochloride having a pH of 1.25. The temperature of the reaction mixture was maintained throughout the period of addition and for 15 minutes thereafter at 20° C. and stirring was continued during the entire period.

Thereafter, the reaction mixture was permitted to separate into a solvent layer and an aqueous layer. The aqueous layer was then extracted with 50 cc. of fresh carbon tetrachloride, permitted to settle and the solvent layer drawn off and combined with the initial solvent layer. The combined solvent phase was then neutralized with potassium carbonate solution and dried by passing through a tower of calcium chloride. The dry neutral solvent solution was distilled to remove the solvent at an absolute pressure of 90 mm. of mercury with refluxing through a column packed with helices. The condenser was maintained at a temperature between —20° and —30° C. The distillate consisted primarily of carbon tetrachloride and contained a minor proportion of the ethyl diazoacetate, which was subsequently recovered. The major portion of the ethyl diazoacetate constituted the residue in the distillation flask. By this procedure, the total yield of ethyl diazoacetate was 94.6%.

*Example II*

The process described in Example I was repeated substantially as described except that the pH of the ethyl glycine hydrochloride solution added was 1.6. In this operation, the yield of ethyl diazoacetate was 88.2%. In a comparative run where the pH of the ethyl glycine hydrochloride solution was adjusted to 3.8 by the addition of sodium acetate prior to mixing with the nitrite solution, all other conditions being substantially identical with those of Example II, the yield of ethyl diazoacetate was 76.7.

I claim:

1. In the process for diazotizing glycine esters of the formula

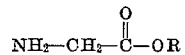

in which R represents a hydrocarbon radical, whereby an acid salt of the glycine ester is reacted with a nitrite of the class consisting of the alkali metal and alkaline earth metal nitrites in aqueous solution in the presence of a liquid aliphatic halogenated hydrocarbon solvent for the resultant diazotized glycine ester, the steps of mixing together the aqueous nitrite solution and the solvent and thereafter gradually adding to the mixture an aqueous solution of the salt of the glycine ester to be diazotized having a pH within the range of 1.0 to 1.6 and excluding from the mixture all other acidic reactants.

2. The process of claim 1 in which the reaction mixture is maintained at about room temperature.

3. The process of claim 1 in which the salt of the glycine ester is the hydrochloride.

4. The process of claim 3 in which the salt of the glycine ester is ethyl glycine hydrochloride.

5. The process of claim 4 in which the halogenated solvent is carbon tetrachloride.

6. The process of claim 1 in which the glycine ester is one having the formula

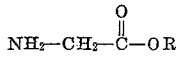

R being an alkyl radical of 1 to 6 carbon atoms.

References Cited in the file of this patent

UNITED STATES PATENTS

| Number | Name | Date |
|---|---|---|
| 2,013,180 | Koch | Sept. 3, 1935 |
| 2,490,714 | Searle | Dec. 6, 1949 |

FOREIGN PATENTS

| Number | Country | Date |
|---|---|---|
| 727,293 | France | Mar. 21, 1932 |

OTHER REFERENCES

Saunders, "The Aromatic Diazo Compounds" (Edward Arnold), p. 3 (1949).

Cain, "Chemistry and Technology of the Diazo-Compounds" (1920), pp. 120 to 123.